(12) United States Patent
Coffman et al.

(10) Patent No.: US 9,259,862 B2
(45) Date of Patent: Feb. 16, 2016

(54) METHOD OF HAVING A PLASTIC CONTAINER HAVING DEEP GRIP RECESSES

(75) Inventors: Adam K. Coffman, Dover, PA (US); Michael T. Kelly, Manchester, PA (US); Sheldon E. Yourist, York, PA (US)

(73) Assignee: GRAHAM PACKAGING COMPANY, L.P., York, PA (US)

( * ) Notice: Subject to any disclaimer, the term of this patent is extended or adjusted under 35 U.S.C. 154(b) by 714 days.

(21) Appl. No.: 13/590,889

(22) Filed: Aug. 21, 2012

(65) Prior Publication Data

US 2014/0054821 A1    Feb. 27, 2014

(51) Int. Cl.
*B29C 45/14* (2006.01)
*B29C 33/62* (2006.01)

(52) U.S. Cl.
CPC ...................... *B29C 33/62* (2013.01)

(58) Field of Classification Search
USPC .......................................... 264/275; 425/515
See application file for complete search history.

(56) References Cited

U.S. PATENT DOCUMENTS

| | | | |
|---|---|---|---|
| 4,804,097 A | 2/1989 | Alberghini et al. | |
| 4,890,752 A | 1/1990 | Ota et al. | |
| 4,993,565 A | 2/1991 | Ota et al. | |
| 5,141,120 A | 8/1992 | Brown et al. | |
| 5,226,550 A | 7/1993 | Mikolaitis et al. | |
| 5,548,951 A | 8/1996 | Mumford et al. | |
| 5,579,937 A | 12/1996 | Valyi | |
| 5,598,941 A | 2/1997 | Semersky et al. | |
| 6,093,364 A | 7/2000 | Fortin | |
| 6,223,920 B1 | 5/2001 | Lane et al. | |
| 6,564,959 B2 | 5/2003 | Saito et al. | |
| 7,097,060 B2 | 8/2006 | Penny et al. | |
| 7,572,123 B2 | 8/2009 | Barker et al. | |
| 2003/0075521 A1 | 4/2003 | Miura | |
| 2005/0073077 A1 | 4/2005 | Whitley | |
| 2005/0253302 A1* | 11/2005 | Nun et al. | 264/338 |
| 2009/0130352 A1* | 5/2009 | Komiya et al. | 428/35.7 |
| 2009/0295030 A1 | 12/2009 | Barker et al. | |

* cited by examiner

*Primary Examiner* — Joseph S Del Sole
*Assistant Examiner* — John Robitaille
(74) *Attorney, Agent, or Firm* — Baker Botts L.L.P.

(57) ABSTRACT

A method of molding a plastic container body having at least one grip recess includes providing a mold assembly having an internal projection that is constructed and arranged to form the grip recess. A low friction surface is provided on at least a portion of the projection in order to reduce friction between the formable plastic material and the projection during the molding process. The low friction surface permits the formable plastic material to stretch with less resistance before it solidifies to the point where additional stretching is not possible. As a result, molding of features that provide resistance to material distribution during molding, such as deep grip recesses, is enabled.

17 Claims, 5 Drawing Sheets

METHOD OF HAVING A PLASTIC CONTAINER HAVING DEEP GRIP RECESSES

BACKGROUND OF THE INVENTION

1. Field of the Invention

This invention relates generally to the field of plastic container manufacturing and tooling, and more specifically to processes and mold assemblies for making a plastic container having a deeper grip recess than was conventionally possible.

2. Description of the Related Technology

Plastic containers are typically fabricated using either injection molding or one of two types of blow molding. The blow molding process is characterized by using internal pressure to force a hot, soft plastic preform or parison against a molding surface. Blow molding can be performed using either a reheat stretch blow molding process, which is typical for plastic containers that are fabricated from polyethylene terephthalate (PET), or an extrusion blow molding process, which is typical for containers that are fabricated from such materials as high-density polyethylene and polyolefins.

In the extrusion blow molding process, a molten tube or parison is continuously extruded from an extrusion fixture. A mold assembly that moves at a speed that is substantially equal to the speed of the extruded parison periodically captures portions of the parison, and pressurization is applied to inflate the captured portion of the parison against the interior surfaces of the mold assembly. The mold assembly is typically mounted for motion on either a molding wheel, which moves in a circular path, or on a shuttle, which moves the mold assembly on a substantially straight path.

In either type of blow molding process, the hot formable plastic material begins to cool and harden as soon as it contacts the mold surface. However, to the extent that the shape defined by the internal surfaces of the mold deviates from a cylinder that is equidistant from the longitudinal axis of the parison or preform the formable plastic material will contact some portions of the internal mold surface before others. In cases where the container body is designed to have deep recesses such as grip recesses for receiving a consumers fingers, prominent projections are formed within the mold that the formable plastic material must contact and stretch around in order to reach the portions of mold surface that form the outermost portions of the container sidewall. The friction that is created between the expanding tube of hot, formable plastic material and such internal mold projections has created practical design limitations that have prevented container manufacturers from introducing designs that would otherwise be favorably received by the public.

A need exists for a method of manufacturing a plastic container that permits the formation of a container having features that are deeper and a result of greater stretching of the hot formable plastic material that has been conventionally possible. Moreover, a need exists for a mold assembly that permits container features that are deeper and more extreme than were previously conventionally possible to be molded.

SUMMARY OF THE INVENTION

Accordingly, it is a first object of the invention to provide a method of manufacturing a plastic container that permits the formation of a container having features that are deeper and a result of greater stretching of the hot formable plastic material than has been conventionally possible.

It is a second object of the invention to provide a mold assembly that permits container features to be molded that are deeper and more extreme than were previously conventionally possible.

In order to achieve the above and other objects on the invention, a method of making a plastic container having a container body with a grip recess defined therein according to a first aspect of the invention includes providing a mold assembly that defines an internal mold surface. The internal mold surface has a first surface portion that has a first frictional coefficient. The internal mold surface further has a projection that is constructed and arranged to form a grip recess. At least a portion of the projection defines a low friction second surface portion that has a second frictional coefficient that is less than the first frictional coefficient. Formable plastic material is applied against the internal mold surface to form a container body having at least one grip recess. The container body is then removed from the mold.

A mold assembly for forming a plastic container according to a second aspect of the invention includes structure defining an internal mold surface. The internal mold service has a first surface portion that has a first frictional coefficient; and a projection that is constructed and arranged to form a grip recess. At least a portion of the projection defines a low friction second surface portion that has a second frictional coefficient that is less than the first frictional coefficient.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
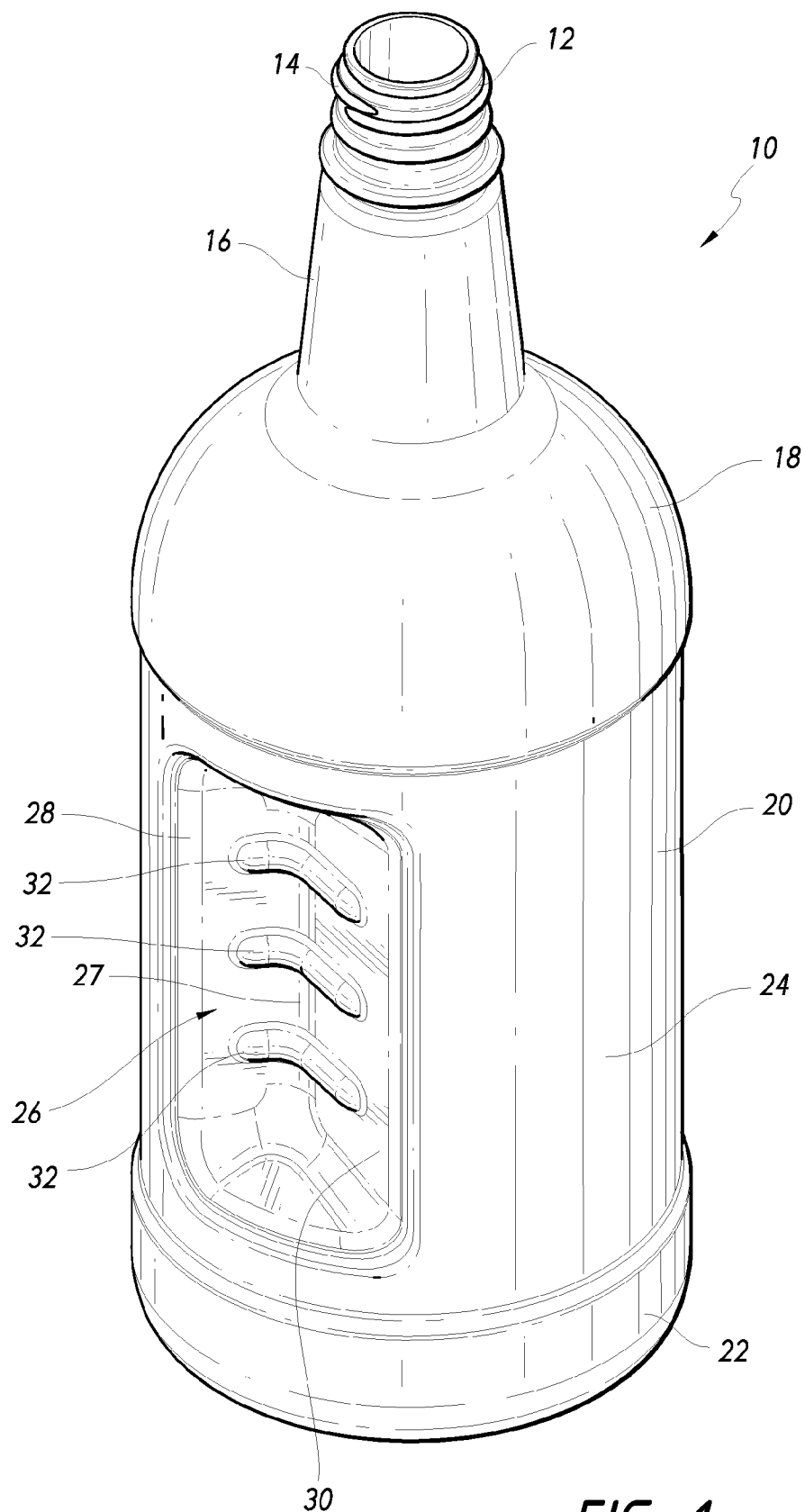
FIG. 1 is a perspective view of a plastic container that is constructed according to a preferred embodiment of the invention.

Referring now to the drawings, wherein like reference numerals designate corresponding structure throughout the views, and referring in particular to FIG. 1, a plastic container 10 includes a finish portion 12 defining an opening that is in communication with an interior of the container 10. Finish portion 12 preferably has one or more helical threads 14 defined thereon for receiving a closure.

In the preferred embodiment, plastic container 10 is fabricated from a material such as polyethylene terephthalate using a standard reheat blow molding process. Alternatively, container 10 could be fabricated using extrusion blow molding process from a material such as polypropylene, polyethylene or polyolefin.

Plastic container 10 further preferably includes a neck portion 16, a shoulder portion 18, a main body portion 20 and a bottom portion 22. In the illustrated embodiment, plastic container 10 is fabricated as a substantially transparent bottle for packaging a beverage such as liquor.

The main body portion 20 has an outer surface 24 that is preferably shaped so as to be substantially cylindrical or substantially round when viewed in transverse cross-section, with the exception of a pair of grip recesses 26 that are defined therein. The bottom portion 22 preferably defines the maximum outer diameter of the container 10 and is preferably substantially round when viewed in transverse cross-section.

Each of the grip recesses 26 preferably includes a first surface 28 that extends inwardly from the outer surface 24 of the main body portion 20. Each grip recess 26 further preferably includes a second surface 30 that extends inwardly from a more forward location on the outer surface 24. A concave recess bottom surface 27 connects the radially inwardmost portions of the first and second surfaces 28, 30.

A plurality of ribs 32 are also preferably defined within the grip recess 26 for providing additional strength. In the preferred embodiment, each of the ribs 32 is oriented substantially transversely and extends over a portion of the first surface 28, the bottom surface 27 and the second surface 30. In the illustrated embodiment, three ribs 32 are provided. The ribs 32 also provide contour to the grip recesses 26 that conforms with the spaces between a consumers fingers, which creates a feeling of firmness and security in the grip.

Figure 2:
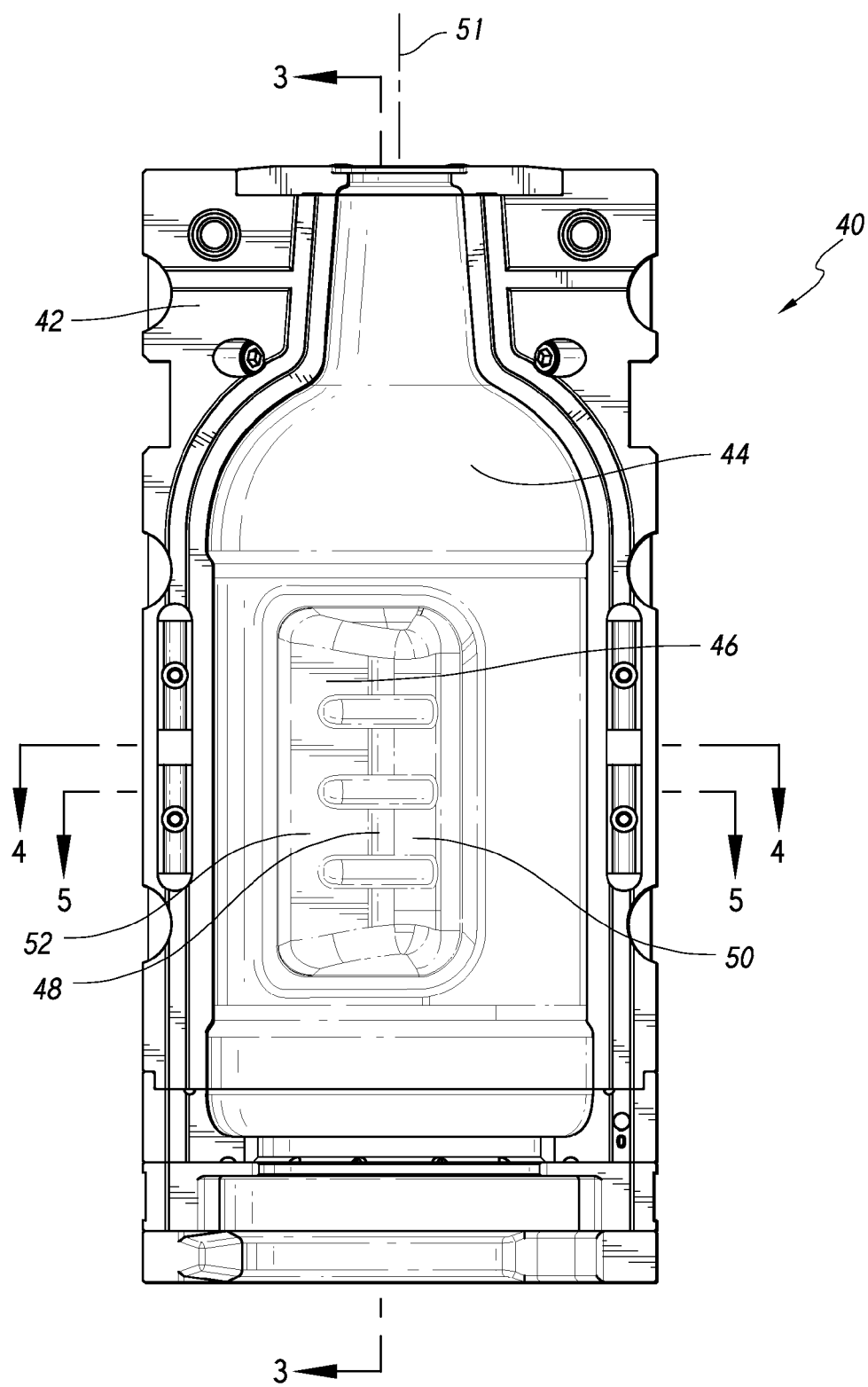
FIG. 2 is a longitudinal cross-sectional view depicting a mold assembly that is constructed according to a preferred embodiment of the invention.
Figure 3:
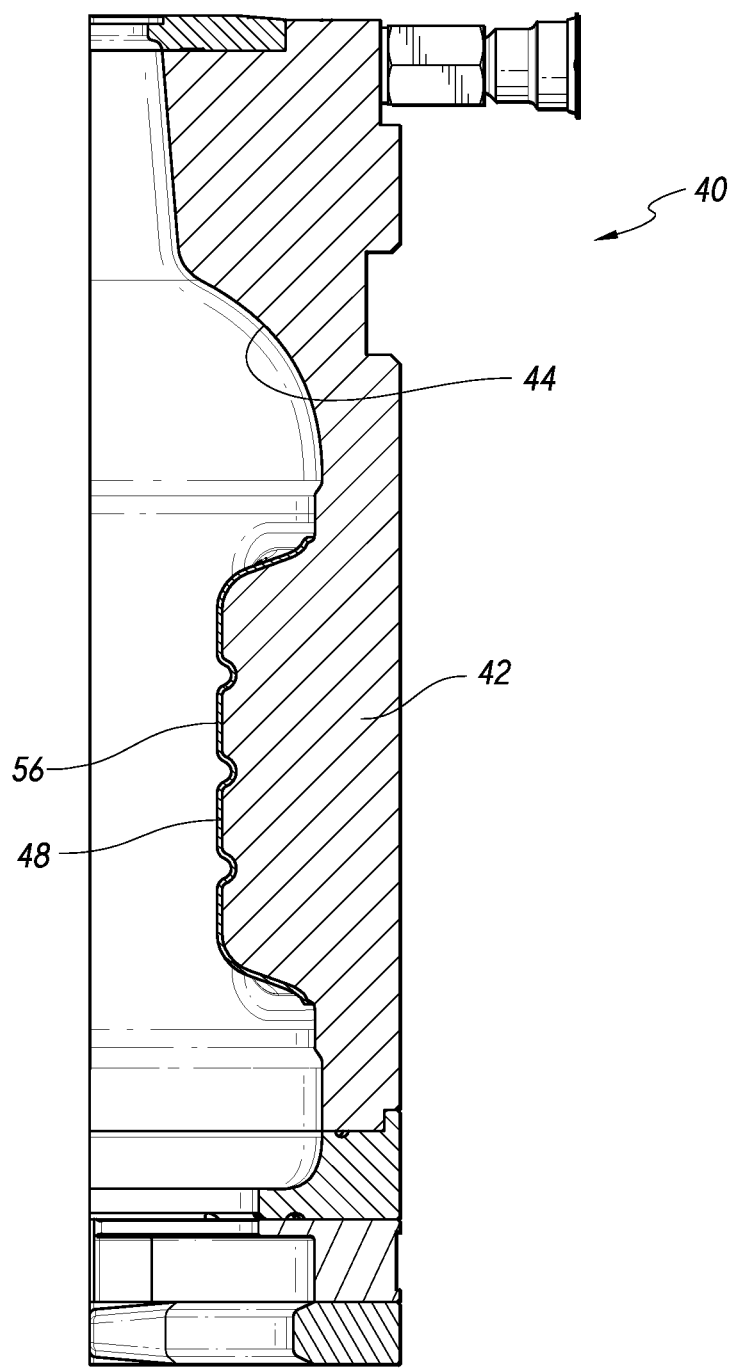
FIG. 3 is a cross-sectional view taken along lines 3-3 in FIG. 2.
Figure 4:
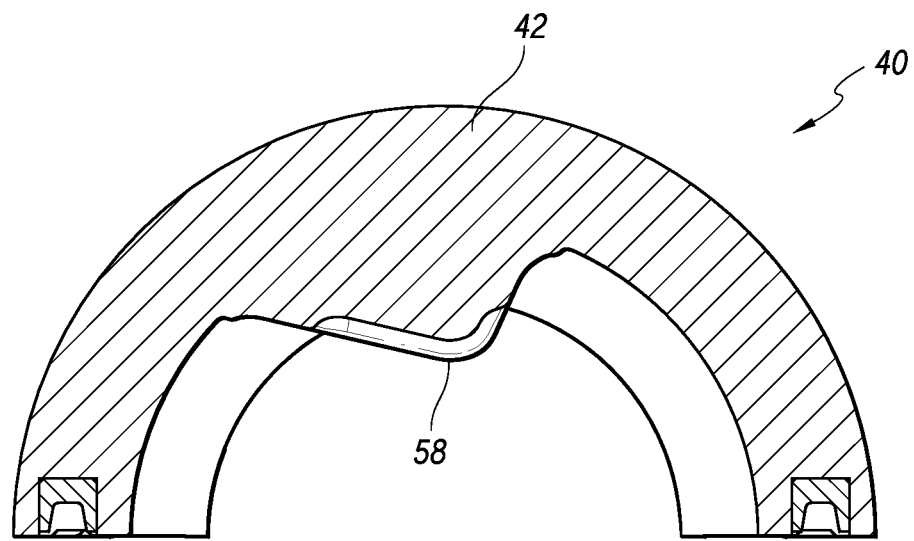
FIG. 4 is a cross-sectional view taken along lines 4-4 in FIG. 2.

Referring now to FIGS. 2-4, a mold assembly 40 according to the preferred embodiment of the invention includes a mold body 42 defining an internal mold surface 44 that is configured to be substantially complementary to the outer surfaces of the desired container shape shown in FIG. 1. The mold assembly has a longitudinal axis 51 that corresponds to the longitudinal axis of the container 10 shown in FIG. 1.

Figure 5:
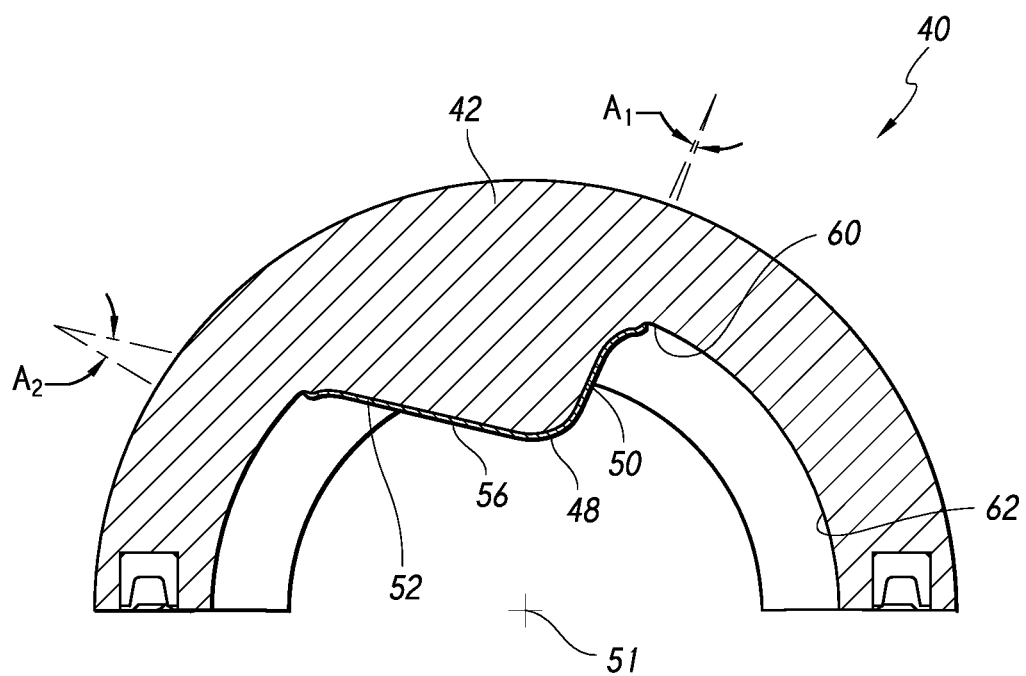
FIG. 5 is a cross-sectional view taken along lines 5-5 in FIG. 2.
Figure 6:
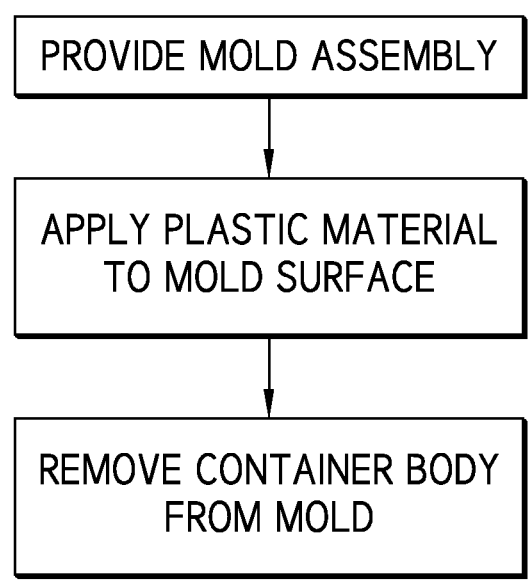
FIG. 6 is a flowchart depicting a method performed according to the preferred embodiment of the invention.

The internal mold surface 44 includes a projection 46 that is adapted to form one of the grip recesses 26 shown in FIG. 1. Referring briefly to FIG. 5, which is a transverse cross-section taken along lines 5-5 in FIG. 2, it will be seen that the projection 46 includes an apex 48, a first side surface 50 that defines a first angle A1 with respect to a first radius extending from the longitudinal axis 51 and a second side surface 52 that defines a second angle A2 to with respect to a second radius extending from the longitudinal axis 51.

In the preferred embodiment, the second angle $A_2$ is greater than the first angle $A_1$. Ergonomically, the longer, more oblique second surface 30 of the grip recess 26 that is formed by the second surface 52 provides a stable surface for the consumers fingers to rest and pinch against while gripping the container 10. The more radial orientation of the first side surface 50, which is not expected to be contacted by a consumer's finger, permits the area of the ground outer surface 24 of the container 10 to be maximized. Geometrically, the radial orientation of the first side surface 50 permits the second side surface 52 and the apex 48 to extend for a greater distance in a rightward direction or "deeper" as viewed in FIG. 5, which enhances the stability of the grip.

The relative deepness of the grip and the near radial orientation of the first side surface 50 is enabled by reducing the frictional engagement between the formable plastic material in the projection 46 during the molding process, which permits the plastic material to more adequately distribute itself to the portion 62 that forms the outer surface 24 of the main body 20 of the container 10. In particular, the frictional reduction permits the material to adequately reach the corner 60 at the base of the projection 46 on the side of the first surface 50 shown in FIG. 5.

In the preferred embodiment, the internal mold surface 44 and specifically the projection 46 defines a first surface portion 54 that has a first frictional coefficient $C_1$ with respect to like material. Another portion of the projection 46 defines a low friction second surface portion 56 that has a second frictional coefficient $C_2$ with respect to like material that is less than the first frictional coefficient $C_1$. The second frictional coefficient $C_2$ has static and kinetic values that are both less than the respective static and kinetic values of the first frictional coefficient $C_1$.

The low friction surface portion 56 in the preferred embodiment includes at least a portion of the apex 46, and preferably at least a portion of the first side surface 50 of the projection 46. In the preferred embodiment, the low friction surface portion 56 includes a coating that is applied to the underlying mold surface by a process such as spraying. Preferably, the coating is a low friction material such as a fluoropolymer. One such coating is commercially available from IMPREGLON under the TEMPCOAT™ brand as code Black966. It is a fluoropolymer coating having a first bonding layer, an intermediate enforcing layer and an upper layer of fluoropolymer material.

Preferably, the second frictional coefficient $C_2$ has a static frictional coefficient value at 1000 grams of load that is substantially within a range of about 0.04 to about 0.5, more preferably substantially within a range of about 0.06 to about 0.25 and most preferably substantially within a range of about 0.08 to about 0.15. The second frictional coefficient $C_2$ further preferably has a kinetic frictional coefficient value at 1000 grams of load that is substantially within a range of about 0.03 to about 0.45, more preferably substantially within a range of about 0.05 to about 0.23 and most preferably substantially within a range of about 0.07 to about 0.14.

The provision of the second surface portion 56 speeds the flow of formable plastic material over the apex 48, so that it can reach the outer mold surfaces 60, 62 prior to hardening.

In an alternative embodiment, the coating could also have insulative properties, which would maintain a higher temperature at the surface that contacts the formable plastic material during molding. This would also tend to extend the timeframe of flexibility of the plastic material as it progresses to the outer mold surfaces 60, 62.

It is anticipated that the low friction surface portion 56 would periodically be inspected for wear or degradation and maintain by replacement or repair as needed to maintain the efficacy of the mold assembly.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of making a plastic container having a container body with a grip recess defined therein, comprising:
providing a mold assembly that defines an internal mold surface, the internal mold surface having a first surface portion that has a first frictional coefficient, the internal mold surface further having a projection configured to form a grip recess, the projection in transverse cross-section includes a first side surface, a second side surface, and an apex defined between the first and second side surfaces, wherein at least a portion of the first side surface of the projection defines a low friction second surface portion that has a second frictional coefficient that is less than the first frictional coefficient;

applying formable plastic material against the internal mold surface to form a container body having at least one grip recess; and removing the container body from the mold.

2. A method of making a plastic container according to claim 1, wherein the mold assembly has a longitudinal axis that corresponds to a longitudinal axis of the container, and wherein the first side surface defines a first angle with respect to a first radius extending from the longitudinal axis and the second side surface defines a second angle with respect to a second radius extending from the longitudinal axis, and wherein the second angle is greater than the first angle.

3. A method of making a plastic container according to claim 2, wherein the low friction second surface portion includes at least a portion of the apex.

4. A method of making a plastic container according to claim 1, wherein the low friction second surface portion comprises a layer of low friction material that is attached to an underlying mold surface.

5. A method of making a plastic container according to claim 4, further comprising applying the layer of low friction material to at least a portion of the projection by a spraying process.

6. A method of making a plastic container according to claim 1, further comprising inspecting the low friction second surface portion.

7. A method of making a plastic container according to claim 6, further comprising performing maintenance on the low friction second surface portion based on results of the inspection.

8. A method of making a plastic container according to claim 4, wherein the low friction material comprises a fluoropolymer.

9. A mold assembly for forming a plastic container having a container body with a grip recess defined therein, comprising:

structure defining an internal mold surface, the internal mold surface having a first surface portion that has a first frictional coefficient; and a projection configured to form a grip recess, the projection as viewed in transverse cross-section including a first side surface, a second side surface, and an apex defined between the first and second side surfaces, wherein at least a portion of the first side surface of the projection defines a low friction second surface portion that has a second frictional coefficient that is less than the first frictional coefficient.

10. A mold assembly according to claim 9, wherein the mold assembly has a longitudinal axis that corresponds to a longitudinal axis of the container, and wherein the first side surface defines a first angle with respect to a first radius extending from the longitudinal axis and the second side surface defines a second angle with respect to a second radius extending from the longitudinal axis, and wherein the second angle is greater than the first angle.

11. A mold assembly according to claim 10, wherein the low friction second surface portion includes at least a portion of the apex.

12. A mold assembly according to claim 9, wherein the low friction second surface portion comprises a layer of low friction material that is attached to an underlying mold surface.

13. A mold assembly according to claim 12, wherein the layer of low friction material comprises a sprayable material.

14. A mold assembly according to claim 12, wherein the low friction material comprises a fluoropolymer.

15. A mold assembly according to claim 9, wherein the internal mold surface is constructed and arranged to form a plastic container body having an outermost periphery as viewed in transverse cross-section that is substantially round.

16. A method of making a plastic container according to claim 1, wherein the first surface portion of the internal mold surface having the first friction coefficient includes at least a portion of the second side surface of the projection.

17. A mold assembly according to claim 9, wherein the first surface portion of the internal mold surface having the first friction coefficient includes at least a portion of the second side surface of the projection.

\* \* \* \* \*